UNITED STATES PATENT OFFICE.

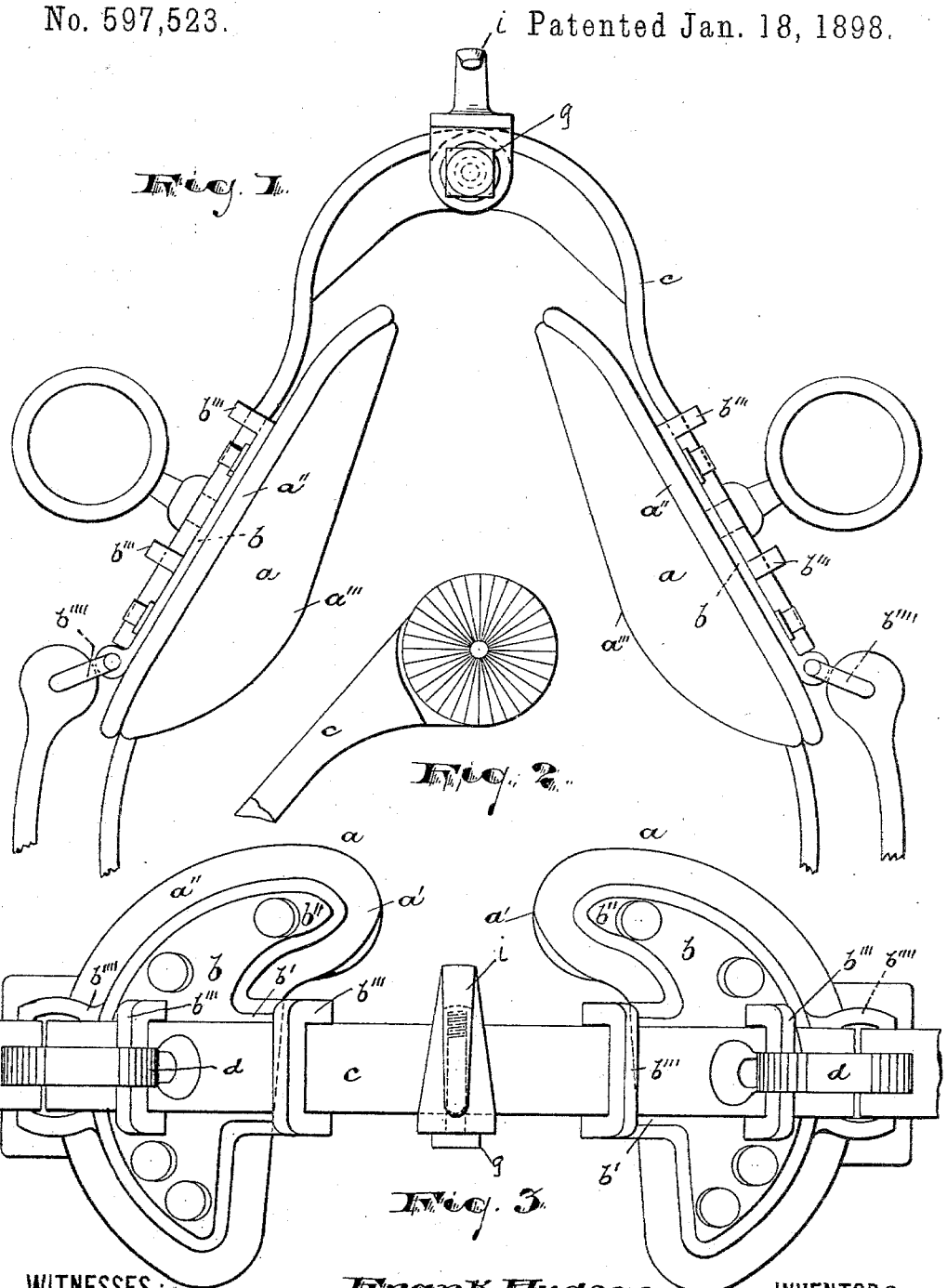

FRANK HUDSON, OF JERSEY CITY, AND WILLIAM MEIER, OF NEWARK, NEW JERSEY.

HARNESS-SADDLE.

SPECIFICATION forming part of Letters Patent No. 597,523, dated January 18, 1898.

Application filed March 22, 1897. Serial No. 628,594. (No model.)

*To all whom it may concern:*

Be it known that we, FRANK HUDSON, of Jersey City, Hudson county, and WILLIAM MEIER, of Newark, in the county of Essex, State of New Jersey, citizens of the United States, have invented certain new and useful Improvements in Harness-Saddles; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide a suitable saddle for horses which will be of greater ease upon the animal's back and one which will serve, in cases where the animal has been made sore by the use of other saddles, in curing the sores by relieving the same of pressure and friction and to permit of the saddle being changed from time to time in its relation to the back or the sores or bruises thereon.

The invention has other objects, some of which may be referred to hereinafter in connection with the description of the working parts.

The invention consists in the improved harness-saddle, and in the arrangements and combinations of parts thereof, all substantially as will be hereinafter set forth, and finally embraced in the clauses of the claim.

Referring to the accompanying drawings, in which like letters of reference indicate corresponding parts in each of the several views, Figure 1 is a front elevation of the improved saddle. Fig. 2 is a detail view of a portion of one of the members of the preferred tree employed therein. Fig. 3 is a plan of the said saddle.

In said drawings, $a$ $a$ indicate two pads adapted to bear upon the animal's back. Said pads are of peculiar shape, the preferred shape being shown more clearly in Fig. 3. Said preferred pads are in plan provided at the forward sides with horns $a'$, adapted to extend a limited distance over the horse's withers, the opposite side of the tree being devoid of such a horn. The said pads comprise heavy harness-leather plates $a''$, to the under or inner sides of which are sewed linings $a'''$, of suitable textile fabric, which linings are of sufficient fullness to form a receptacle for a filling, such as of hair or other filling material, to give the desired rotundity and softness to the under side. Upon the upper faces of said leather plates are secured, by suitable pad-screws, metal plates $b$ of sufficient width to hold the broad pads flat upon or in proper conformity to the back. These said plates $b$ are also provided with horns $b'$ $b''$, the first of which extend in the line of the tree $c$ and serve as bearings for said tree, the said extensions $b'$ being preferably provided with loops $b'''$, cast integral with the plates, through which the said tree is passed in the manner indicated in Fig. 3. The said tree is adapted to slide in said loops and others cast on the bodies of said plates, to admit of the adjustment as hereinafter described. Said tree and plates are held in rigid relation by means of the terrets $d$ $d$, or they may be adjustably secured.

Below the horns or extensions $b'$ and in alinement therewith are formed the backband loops or eyes $b''''$, which are also integral with the plates. At the forward side of the said horns or extensions $b'$ are formed second extensions of horns $b''$, which are curved upward and forward from the line of the tree, as shown, so as to extend over a portion of the animal's withers and present a broad and firm bearing thereupon, the said horns being bent out of the planes of their respective plates, so as to fit the animal. On the opposite or rearward side of the tree the pads and the plates thereon are devoid of upward-extending horns in the preferred construction, so as to provide a greater space or clearance for the sores upon the horse's back.

The pad-screws are suitably held in place by pad-nuts of any ordinary kind under or on the inside of the back-leather.

The tree is preferably made flat at its extremities, so as to have a firm bearing upon the upper face of the pad-plates and slide thereon, and provided at its opposite ends with a series of holes $h$ $h$ to receive the terret and admit of the desired adjustment. At the center of the tree, at the check-hook, we provide a pivotal joint of any ordinary construction, by means of which the opposite sides of the tree may be changed in relation to one another, either by spreading apart or being brought together to increase or decrease the angle therein and adapt the saddle to lean or fat horses.

Having thus described the invention, what we claim as new is—

1. The combination in a saddle with a suitable tree of pads secured at the opposite ends of said tree, the said pads each having an upwardly and forwardly inclined horn or extension on the forward side of the tree and at the opposite side being devoid of such an extension, substantially as set forth.

2. The improved harness-saddle, comprising adjustable pads, a tree having, at each end, bearings to receive said pads, said tree having at each end, a plurality of independent receptacles for fastening means on said pad, and said fastening means coöperating with those on the tree to secure positive fastenings of the pads on said tree at various points on its bearings, substantially as set forth.

In testimony that we claim the foregoing we have hereunto set our hands this 2d day of March, 1897.

FRANK HUDSON.
WILLIAM MEIER.

Witnesses:
CHARLES H. PELL,
C. B. PITNEY.